US012492895B2

(12) United States Patent
Lukic et al.

(10) Patent No.: US 12,492,895 B2
(45) Date of Patent: Dec. 9, 2025

(54) METHOD FOR COMPARING A RECEIVED BEAM INCIDENT ON A LASER RECEIVER WITH A ROTATING LASER BEAM

(71) Applicant: Hilti Aktiengesellschaft, Schaan (LI)

(72) Inventors: Sasha Lukic, Buchs (CH); Andras Halasi, Feldkirch (AT); Ian Kearney, Feldkirch (AT); Ermin Calkic, Buchs (CH)

(73) Assignee: Hilti Aktiengesellschaft, Schaan (LI)

( * ) Notice: Subject to any disclaimer, the term of this patent is extended or adjusted under 35 U.S.C. 154(b) by 2026 days.

(21) Appl. No.: 16/313,275

(22) PCT Filed: Jun. 21, 2017

(86) PCT No.: PCT/EP2017/065159
§ 371 (c)(1),
(2) Date: Dec. 26, 2018

(87) PCT Pub. No.: WO2018/001804
PCT Pub. Date: Jan. 4, 2018

(65) Prior Publication Data
US 2019/0154444 A1    May 23, 2019

(30) Foreign Application Priority Data
Jun. 30, 2016    (EP) .................................... 16177221

(51) Int. Cl.
G01C 15/00    (2006.01)
G01C 15/02    (2006.01)
G01C 15/12    (2006.01)

(52) U.S. Cl.
CPC ......... *G01C 15/006* (2013.01); *G01C 15/004* (2013.01); *G01C 15/02* (2013.01); *G01C 15/12* (2013.01)

(58) Field of Classification Search
CPC .................................................... G01C 15/006
See application file for complete search history.

(56) References Cited

U.S. PATENT DOCUMENTS 7,119,316 B2    10/2006    Green et al.
7,224,473 B2    5/2007    Zalusky
(Continued)

FOREIGN PATENT DOCUMENTS

JP    7-318317 A    12/1995
JP    8-247761 A    9/1996
(Continued)

OTHER PUBLICATIONS

PCT/EP2017/065159, International Search Report (PCT/ISA/220 and PCT/ISA/210) dated Sep. 5, 2017, with partial English translation, enclosing Written Opinion of the International Searching Authority (PCT/ISA/237) (Thirteen (13) pages).
(Continued)

*Primary Examiner* — Michael A Berns
(74) *Attorney, Agent, or Firm* — Crowell & Moring LLP

(57) ABSTRACT

A method for comparing a received beam incident on a laser receiver in a longitudinal arrangement with a rotating laser beam which is moved by a rotating laser in a horizontal position about an axis of rotation, where the laser receiver includes an evaluation unit and a detection field having a longitudinal direction and a transverse direction, includes disposing the rotating laser on a tripod adjustable along an axis and the horizontal laser plane that the rotating laser beam produces is moved by the tripod in a height direction along the axis. In the longitudinal direction of the detection field, the evaluation unit determines an adjustment direction of the received beam relative to the laser receiver, and the evaluation unit compares the adjustment direction of the received beam with the height direction of the tripod.

15 Claims, 5 Drawing Sheets

(56) References Cited

U.S. PATENT DOCUMENTS

| | | | |
|---|---|---|---|
| 7,838,808 B1 | 11/2010 | Ake | |
| 7,970,519 B2 | 6/2011 | Green | |
| 8,567,078 B2 * | 10/2013 | Stefan | G01C 15/004 |
| | | | 33/290 |
| 8,869,411 B2 * | 10/2014 | Lukic | G01C 15/004 |
| | | | 33/228 |
| 10,823,565 B2 * | 11/2020 | Winter | G01S 17/86 |
| 10,823,566 B2 * | 11/2020 | Lukic | G01J 1/0219 |
| 2019/0154444 A1 * | 5/2019 | Lukic | G01C 15/004 |

FOREIGN PATENT DOCUMENTS

| | | |
|---|---|---|
| JP | 2010-505052 A | 2/2010 |
| JP | 2012-112953 A | 6/2012 |

OTHER PUBLICATIONS

U.S. Patent Application, "Procedure for Comparing a Reception Beam Impinging on a Laser Receiver with a Rotating Laser Beam", filed Dec. 26, 2018, Inventor: Sasha Lukic et al.

U.S. Patent Application, "Method for Comparing a Received Beam Hitting a Laser Receiver with a Rotating Laser Beam", filed Dec. 26, 2018, Inventor: Sasha Lukic et al.

English Machine Translation of JP 7-318317 A, previously cited as B1 on Apr. 9, 2020 (Eight (8) pages).

* cited by examiner

METHOD FOR COMPARING A RECEIVED BEAM INCIDENT ON A LASER RECEIVER WITH A ROTATING LASER BEAM

CROSS REFERENCE TO RELATED APPLICATIONS

This application claims the priority of International Application No. PCT/EP2017/065159, filed Jun. 21, 2017, and European Patent Document No. 16177221.5, filed Jun. 30, 2016, the disclosures of which are expressly incorporated by reference herein.

BACKGROUND AND SUMMARY OF THE INVENTION

The present invention relates to a method for comparing a received beam incident on a laser receiver with a rotating laser beam as well as a device for executing such a method.

Rotating lasers are used indoors and outdoors for levelling and marking tasks, such as displaying horizontally, vertically or transversely running laser markings on a target surface or determining and verifying level height courses, vertical lines, alignment and plumb points. Rotating lasers can be arranged in various device positions, which are designed as a horizontal position and vertical position. In doing so, one differentiates between horizontally usable rotating lasers, which are used solely in the horizontal position, and horizontally and vertically usable rotating lasers, which are used in the horizontal and vertical positions.

In regard to rotating lasers, which may be used without protective measures, such as protective eyewear, the maximum laser power is limited. When performing levelling and marking tasks outdoors, the permitted maximum laser outputs often result in non-visible or poorly visible laser beams. To improve the visibility of the laser beams, target panels or laser receivers are held in the laser beam. Laser receivers are held as handheld devices by a user directly in the laser beam or are attached to a telescopic or levelling rod. Laser receivers can be equipped with a height measurement function, which determines the incident position of a received beam on a detection field of the laser receiver and shows the distance of the received beam to a zero position of the detection field as a height position. Known laser receivers with a height measurement functions comprise an evaluation unit and at least one detection field having a longitudinal direction and a transverse direction, wherein the laser receiver is oriented, as a function of the device position of the rotating laser, in a longitudinal direction or a transverse direction. For a rotating laser in a horizontal position, the longitudinal direction of the detection field is oriented parallel to the gravitational direction (longitudinal arrangement), and for a rotating laser in a vertical position, the transverse direction of the detection field is arranged parallel to the gravitational direction (transverse configuration).

When performing levelling and marking tasks, incorrect measurements may result due to extraneous beams or reflections of the rotating laser beam. Various methods are known for comparing a received beam incident on the laser receiver with the rotating laser beam. To reduce the risk of incorrect measurements using a laser receiver, it is known to modulate the rotating laser beam of the rotating laser with a modulation signal. The received beam incident on the laser receiver is evaluated by the evaluation unit of the laser receiver and categorized as a rotating laser beam if the received beam was modulated with the modulation signal. The disadvantage is that a reflection of the rotating laser beam on a reflecting surface is not detected by the evaluation unit. The reflected laser beam was modulated using the modulation signal and is categorized by the evaluation unit of the laser receiver as a rotating laser beam.

U.S. Pat. No. 7,119,316 B2 discloses another known method for comparing a received beam incident on a laser receiver with a rotating laser beam, which is emitted by a rotating laser. The laser receiver comprises a detection field, which is composed in a longitudinal direction of multiple photo-detector arrays, wherein the photo-detector arrays each comprise in the longitudinal direction multiple photo-detectors. When a received beam strikes the detection field, the evaluation unit determines first and second reference signals for every photo-detector array, wherein the first and second reference signal represent the amplitudes of the external photo-detectors of the photo-detector array, which are captured by the received beam. The reference signals are further processed by the evaluation unit by summation, subtraction, and division, until a quotient results for the evaluation. This quotient is compared with a preset limit value. If the quotient is less than the limit value, the received beam is categorized as a laser beam ("moving thin beam of laser light"). If the quotient is greater than the limit value, the received beam is categorized as an extraneous beam ("omni-directional pulse of light").

Another method is known from U.S. Pat. No. 7,224,473 B2 for comparing a received beam incident on a laser receiver with a rotating laser beam. The laser receiver comprises a detection field, which is composed in the longitudinal direction of multiple photo-detectors, and one additional photo-detector. When a received beam strikes the laser receiver, the evaluation unit determines a first, second or third reference signal, wherein the first reference signal represents the electrical output of a first external photo-detector that is sensed by the received beam, the second reference signal represents the electrical output of a second external photo-detector that is sensed by the received beam, and the third reference signal represents the electrical output of the additional photo-detector. Using the third reference signal, an evaluation of the received beam is performed. If the amplitude of the third reference signal is "sufficiently low", the received beam is categorized as a laser beam of the rotating laser. However, if the amplitude of the third reference signal is "sufficiently high", the laser beam is categorized as an extraneous beam ("omni-directional pulse of light").

The methods known from U.S. Pat. No. 7,119,316 B2 and U.S. Pat. No. 7,224,473 B2 regarding a procedure for comparing a received beam incident on a laser receiver with a rotating laser beam of a rotating laser have the disadvantage that a reflection of the rotating laser beam on a reflecting surface is not detected by the evaluation unit of the laser receiver and is incorrectly categorized as a rotating laser beam. The reflection of the rotating laser beam on the reflecting surface does not change the amplitudes of the reference signal, or only changes them to an insignificant degree, and has no influence on the criteria for evaluating the received beam.

The object of the present invention consists of developing a method for comparing a received beam incident on a laser receiver with a rotating laser beam, in which the risk of incorrect measurements is decreased by a reflection of the rotating laser beam on a reflecting surface. In addition, the method is to be suitable for largely automatic execution.

According to the invention, the method for comparing a received beam incident on a laser receiver with a rotating laser beam, which is moved by a rotating laser around an axis of rotation, wherein the laser receiver comprises an evaluation unit and at least one detection field having a longitudinal direction and a transverse direction has the steps:

the rotating laser is arranged on a tripod adjustable along an axis, wherein the axis of rotation of the rotating laser and the axis of the tripod are essentially oriented parallel to a gravitational direction of the field of gravity;

the laser receiver is oriented in a longitudinal arrangement, wherein in the longitudinal arrangement, the longitudinal direction of at least one detection field in the longitudinal arrangement is oriented essentially parallel to the gravitational direction, and the transverse direction of the at least one detection field is oriented essentially perpendicular to the gravitational direction;

the rotating laser is adjusted on the tripod in a height direction along the axis at least until the received beam is incident on the at least one detection field of the laser receiver;

in the longitudinal direction of the at least one detection field, the evaluation unit determines an adjustment direction of the received beam relative to the laser receiver; and the adjustment direction of the received beam is compared with the height direction of the tripod by the evaluation unit.

The method according to the invention for comparing a received beam with a rotating laser beam is suitable for rotating lasers, which are arranged in a horizontal position on an adjustable tripod, and laser receivers, which are positioned in a longitudinal arrangement. The horizontal position of the rotating laser and the longitudinal arrangement of the laser receiver are defined by an orientation of the components to the gravitational direction of the field of gravity, wherein the gravitational direction is oriented toward the center of gravity of the earth. In regard to the orientation of the components, the following apply: the axis of rotation of the rotating laser, the height direction of the tripod and the longitudinal direction of the detection field are oriented parallel to the gravitational direction, and the transverse direction of the detection field is oriented perpendicular to the gravitational direction, wherein the rotating laser beam produces a horizontal laser plane, which is arranged perpendicular to the gravitational direction. Within the scope of the method according to the invention, the evaluation unit determines an adjustment direction of the received beam relative to the laser receiver and compares the adjustment direction of the received beam with the height direction of the tripod. An inclination of the laser receiver out of the longitudinal arrangement is not critical when executing the method according to the invention. Even when the laser receiver is inclined, one can determine the adjustment direction of the received beam relative to the laser receiver by means of the evaluation unit of the laser receiver and compare it with the height direction of the tripod.

The evaluation unit evaluates the received beam using the adjustment direction and distinguishes between a rotating laser beam, a reflected rotating laser beam and a non-rotating extraneous beam. By means of the method according to the invention, a reflection of the rotating laser beam can be detected on a reflecting surface; in addition, extraneous beams, which do not rotate about an axis of rotation, can be distinguished from rotating laser beams. In regard to non-rotating extraneous beams, the evaluation unit cannot determine any adjustment direction of the received beam relative to the laser receiver. By comparing the adjustment direction of the received beam and the height direction of the tripod, a reflection of the rotating laser beam can be detected on a reflecting surface by the evaluation unit. The tripod moves the rotating laser at a known height direction along the axis. After a reflection on a reflecting surface, when the rotating laser beam is incident on the laser receiver as a received beam, the adjustment direction of the received beam is opposite to the known height direction of the tripod. The method according to the invention has the advantage that known rotating lasers, tripods and laser receivers are suited for executing the method and no special components are required.

Preferably, a first incident position of the received beam on the at least one detection field is saved by the evaluation unit at a first point in time as a first height position, and a second incident position is saved at a later second point in time as a second height position, and the adjustment direction of the received beam is determined by the evaluation unit from the first and second height positions. The rotating laser is adjusted by the tripod in a known height position (positive height direction or negative height direction) along the axis until the detection field of the laser receiver detects a received beam. Subsequently, the height adjustment of the rotating laser is continued along the axis. During the height adjustment of the rotating laser, the first and second incident positions of the received beam on the detection field are determined by the evaluation unit. The laser receiver is equipped in a longitudinal direction with a measuring function, which measures the position of the vertical laser plane relative to the zero position of the detection field. The first incident position has a distance to the zero position of the detection field, which is referred to as first height position H1, and the second incident position has a distance to the zero position of the detection field, which is referred to as second height position H2. The adjustment direction of the received beam runs parallel to the longitudinal direction of the detection field and the difference between the first and second height positions ($\Delta=H2-H1$) determines the direction (positive or negative direction) of the adjustment direction of the received beam.

The additional method steps of the method according to the invention depend on whether the evaluation unit can determine an adjustment direction of the received beam relative to the laser receiver from the first and second height positions. Depending on the adjustment direction of the received beam, one can differentiate non-rotating extraneous beams and reflected laser beams from rotating laser beams by means of the method according to the invention.

The received beam is categorized as an extraneous beam by the evaluation unit of the laser receiver when the first and second height positions of the received beam essentially match. Any beam that differs from the rotating laser beam of the rotating laser is designated as an extraneous beam. For non-rotating extraneous beams, the first and second height positions, which are produced by the received beam on the detection field, essentially match and the evaluation unit of the laser receiver can determine no adjustment direction of the received beam relative to the laser receiver from the first and second height positions.

If the first and second height positions of the received beam differ, the adjustment direction of the received beam is determined by the evaluation unit of the laser receiver. The adjustment direction of the received beam is defined as a positive direction when the difference between the first and second height positions ($\Delta=H2-H1$) is greater than zero, and the adjustment direction of the received beam is defined as a negative direction when the difference between the first and second height positions ($\Delta$=H2−H1) is less than zero.

The additional method steps of the method according to the invention depend on whether the adjustment direction of the received beam and the height direction of the tripod are oriented in the same direction or opposite directions. The method according to the invention distinguishes between two variants: in a first variant, the adjustment direction of the received beam and the direction of rotation of the rotating laser beam are oriented in the same direction, and in a second variant, the adjustment direction of the received beam and the direction of rotation of the rotating laser beam are opposite to each other.

When the adjustment direction of the received beam and the height direction of the tripod are oriented in the same direction, the received beam is categorized as a rotating laser beam by the evaluation unit of the laser receiver. The rotating laser moves the rotating laser beam in a known direction of rotation about the axis of rotation and the tripod moves the rotating laser in a known height direction along the axis of the tripod. When the rotating laser beam strikes the laser receiver as a received beam without reflecting on a reflecting surface, the adjustment direction of the received beam is oriented in the same direction as the known height direction of the tripod. In the method according to the invention, the evaluation unit of the laser receiver always categorizes the received beam as a rotating laser beam when the adjustment direction of the received beam and the height direction are oriented in the same direction.

For an even number of reflections of the rotating laser beam, the adjustment direction of the received beam is also oriented in the same direction as the known height direction of the tripod so that received beams, which are created by an even number of reflections of the rotating laser beam, are categorized incorrectly as rotating laser beams. In the practical application of rotating lasers and laser receivers, the simple reflection of the rotating laser beam on a reflecting surface represents the most frequent cause of incorrect measurements, so that the method according to the invention reduces the risk of incorrect measurements, but it cannot fully prevent incorrect measurements.

In a particularly preferred manner, the evaluation unit switches the laser receiver into a measurement mode, wherein in the measurement mode, a height position of the received beam is determined on the detection field of the laser receiver. If an incident received beam was categorized by the evaluation unit of the laser receiver as a rotating laser beam, the laser receiver can be implemented as intended. To do so, one can switch the laser receiver of the evaluation unit into a measurement mode.

If the adjustment direction of the received beam and the height direction of the tripod are opposite to each other, the received beam is categorized by the evaluation unit of the laser receiver as a reflected laser beam. The rotating laser moves the rotating laser beam in a known direction of rotation about the axis of rotation, and the tripod moves the rotating laser in a known height direction along the axis of the tripod. When the rotating laser beam strikes the laser receiver as a received beam after a reflection on a reflecting surface, the adjustment direction of the received beam is opposite to the known height direction of the tripod. In the method according to the invention, the evaluation unit of the laser receiver always categorizes the received beam as a reflected laser beam when the adjustment direction of the received beam and the height direction of the tripod are opposite to each other.

When there is an odd number of reflections of the rotating laser beam, the adjustment direction of the received beam is also opposite to the known height direction of the tripod, so that received beams, which are created by an odd number of reflections of the rotating laser beam, are correctly categorized by the evaluation unit as reflected laser beams.

In the method according to the invention, the horizontal laser plane, which produces the rotating laser beam, is adjusted by means of the tripod. The evaluation unit of the laser receiver generates an adjustment direction of the horizontal laser plane and compares the adjustment direction with the height direction of the tripod. One shall thereby note that the adjustment direction depends on the position of the laser receiver, and the adjustment directions in opposite positions of the laser receiver are opposite to each other. The position of the laser receiver relative to the rotating laser can be determined by means of the rotating laser beam.

In a first preferred further development of the method, the rotating laser beam produces a horizontal laser plane limited to an angle $\varphi$ smaller than 360°. The restricted horizontal laser plane can thereby be produced in a rotation mode or a scan mode of the rotating laser. In the rotation mode, the laser beam is moved repeatedly in a same direction of rotation 360° about the axis of rotation, and in the scan mode the laser beam is moved back and forth in alternating directions of rotation in a restricted angle about the axis of rotation.

In a first variant of the method, the rotating laser beam is moved in a direction of rotation across 360° of the axis of rotation, wherein the laser beam is switched on within angle $\varphi$ and switched off outside of angle $\varphi$. The first variant is suited for rotating lasers that have a rotation mode.

In a second alternative variant of the method, the rotating laser beam is moved back and forth within angle $\varphi$ in alternating directions of rotation about the axis of rotation. The second variant is suited for rotating lasers that have a scan mode.

In a second preferred further development of the method, the rotating laser beam is moved in a direction of rotation across 360° about the axis of rotation and the angle of 360° is subdivided into a first and second angle range, wherein the rotating laser beam in the first and second angle range is differentiated by one beam property or multiple beam properties. Within the scope of the method according to the invention, the evaluation unit of the laser receiver analyzes the incident received beam. By means of the beam property, in which the rotating laser beam is differentiated in the first and second angle range, the evaluation unit can determine the angle range in which the detection field of the laser receiver was struck by the received beam.

Preferably, the rotating laser beam is modulated using a modulation signal, wherein a first modulation signal is used in a first angle range, and a second modulation signal, which differs from the first modulation signal, is used in the second angle range. The first and second modulation signals may differ from each other in an amplitude, a shape and/or a modulation frequency. Within the scope of the method according to the invention, the evaluation unit of the laser receiver analyzes the incident received beam and can determine the modulation signal, with which the received beam was modulated. By means of the modulation signal, the evaluation unit can determine the angle range in which the detection field of the laser receiver was struck by the received beam.

According to the invention, to execute a method for comparing a received beam incident on a laser receiver with a rotating laser beam, a device is provided that has a rotating laser, which emits a laser beam rotating about an axis of rotation in a direction of rotation and is arranged on a tripod, and a laser receiver, which has an evaluation unit and at least one detection field. The rotating laser is arranged in a horizontal position on the adjustable tripod and the laser receiver is oriented in a longitudinal arrangement. In regard to the components, the following applies: the axis of rotation of the rotating laser, the height direction of the tripod and the longitudinal direction of the detection field are oriented parallel to the gravitational direction, and the transverse direction of the detection field is oriented perpendicular to the gravitational direction, wherein the rotating laser beam produces a horizontal laser plane, which is arranged perpendicular to the gravitational direction.

In a particularly preferred manner, the laser receiver has an inclination sensor that measures an inclination of the laser receiver relative to the gravitational direction. The inclination sensor can be used to clearly specify the orientation of the laser receiver. When executing the method according to the invention, the laser receiver is oriented in a longitudinal arrangement, wherein the longitudinal direction of the detection field in the longitudinal arrangement is to run parallel to the gravitational direction and the transverse direction of the detection field in the longitudinal arrangement is to run perpendicular to the gravitational direction. The longitudinal direction of the detection field and the gravitational direction may be oriented in the same direction or in the opposite direction to each other. By means of an inclination sensor, the two orientations "aligned" and "opposite" can be distinguished from each other.

In a particularly preferred manner, the tripod and the laser receiver can be connected via a communications link, wherein communication between the evaluation unit of the laser receiver and a control unit of the tripod results. When executing the method according to the invention, the evaluation unit of the laser receiver determines from the first and second height positions an adjustment direction of the received beam relative to the laser receiver and compares the adjustment direction of the received beam with the height direction of the tripod. The height direction of the tripod can be transmitted via the communications link to the evaluation unit of the laser receiver so that the method according to the invention can be executed automatically.

Embodiments of the invention are described below using the drawings. It is not necessarily meant to represent the embodiments to scale; instead, the drawings, where useful for explanatory purposes, are drawn in a schematic and/or slightly distorted form. One shall thereby take into account that various modifications and changes pertaining to the form and detail of an embodiment can be made, without departing from the general idea of the invention. The general idea of the invention is not restricted to the exact form or detail of the preferred embodiment shown and described below, or restricted to a subject matter, which would be restricted in comparison to the subject matter claimed in the claims. In regard to the provided measurement ranges, values lying within the mentioned limits are disclosed as limit values and may be arbitrarily used and claimed. For simplicity's sake, the same reference signs are used for identical or similar parts, or parts with identical or similar functions.

DETAILED DESCRIPTION OF THE DRAWINGS

Figure 1:
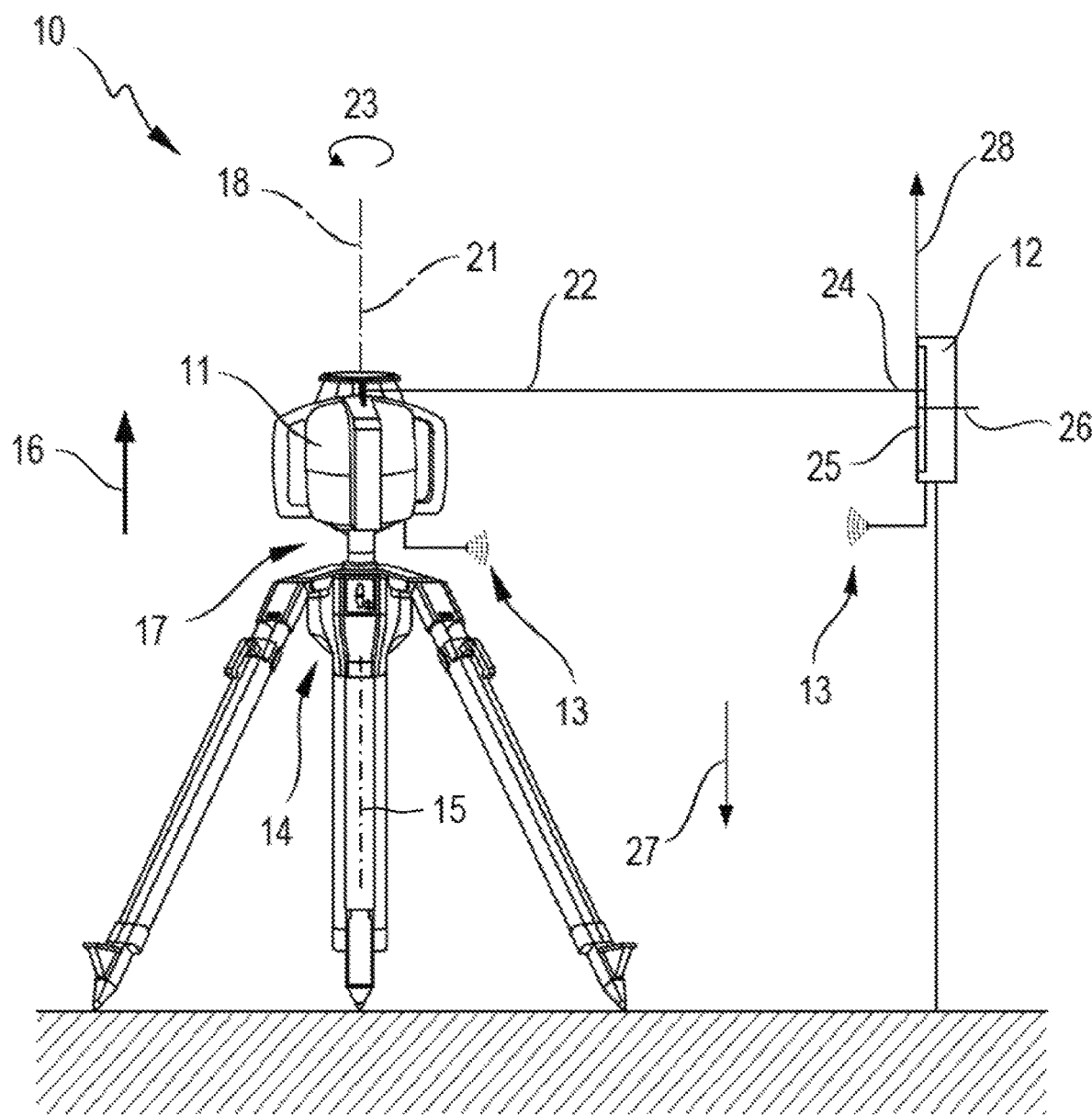
FIG. 1 illustrates a device having a rotating laser and a laser receiver.

FIG. 1 depicts a device 10 having a rotating laser 11 and a laser receiver 12, which can be connected via a communications link 13. Communications link 13 is designed as a wireless or a wire-based communications link. Rotating laser 11 is arranged in a horizontal position, which is provided for horizontal applications of rotating laser 11, and laser receiver 12 is arranged in a longitudinal arrangement. Device 10 is provided for executing a method according to the invention for comparing a received beam incident on a laser receiver 12 with a rotating laser beam of rotating laser 11.

Rotating laser 11 is arranged on a motor-driven tripod, which allows for automatic height adjustments of rotating laser 14 along an axis 15 in a height direction 16. In addition, a rotating platform 17 may be provided, which allows an automatic angle adjustment of rotating laser 11 about axis of rotation 18 of rotating platform 17. Rotating platform 17 may be integrated in tripod 14 or rotating laser 11, or be designed as a separate component, which is arranged on tripod 14. Rotating laser 11 is designed as a horizontally or vertically usable rotating laser, which emits a laser beam 22 rotating about an axis of rotation 21 of rotating laser 11. Rotating laser beam 22 rotates in a direction of rotation 23 about axis of rotation 21 and produces a laser plane, which is arranged perpendicular to axis of rotation 21 of rotating laser 11.

Laser receiver 12 is equipped with a height measurement function, which determines an incident position of a received beam 24 on a detection field 25 of laser receiver 12, and represents the distance of received beam 24 to a zero position 26 of detection field 25 as a height position. The orientation of laser receiver 12 is specified by means of detection field 25 and a gravitational direction 27 of the gravitational field. Detection field 25 of laser receiver 12 has in a longitudinal direction 28 a detection height and in a transverse direction 29 a detection width. Longitudinal direction 28 corresponds to the measurement direction of laser receiver 12 and transverse direction 29 is oriented perpendicular to longitudinal direction 25. The longitudinal arrangement refers to the orientation of laser receiver 12, in which longitudinal direction 28 of detection field 25 is oriented parallel to gravitational direction 27 and transverse direction 29 of detection field 25 is oriented perpendicular to gravitational direction 27, and a transverse configuration refers to the orientation of laser receiver 12, in which longitudinal direction 28 of detection field 25 is oriented perpendicular to gravitational direction 27 and transverse direction 29 of detection field 25 is oriented parallel to gravitational direction 27.

Figure 2:
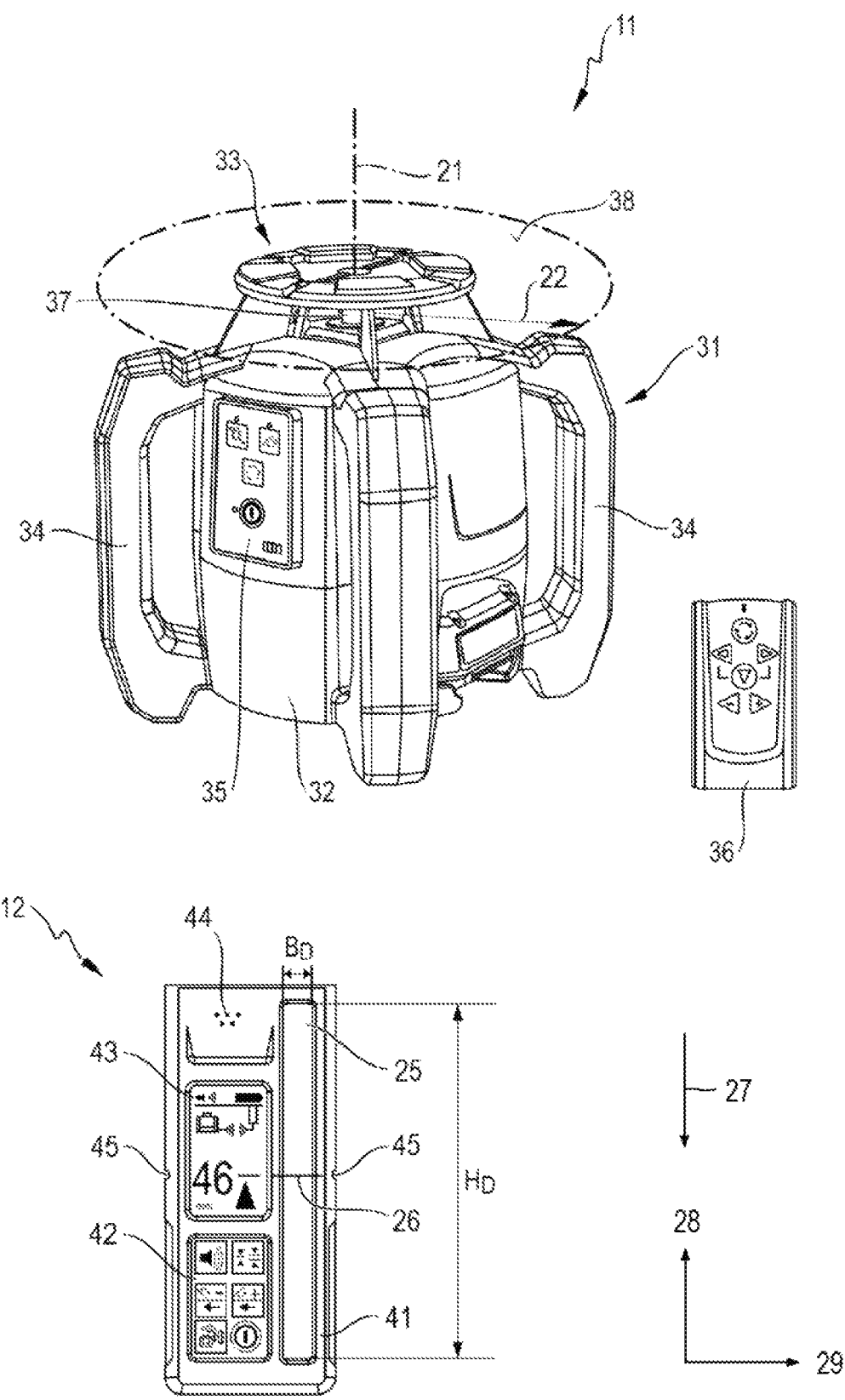
FIG. 2 illustrates the rotating laser and laser receiver of FIG. 1 in a three-dimensional view, wherein the rotating laser is oriented in horizontal position and the laser receiver is oriented in a longitudinal direction.

FIG. 2 depicts rotating laser 11 and laser receiver 12 of FIG. 1 in a three-dimensional view, wherein rotating laser 11 and laser receiver 12 are oriented for executing the method according to the invention in a horizontal position or in a longitudinal arrangement.

Rotating laser 11 comprises a device housing 31 and a measuring device arranged in device housing 31. Device housing 31 consists of a basic housing 32, a rotating head 33 and multiple handles 34. Rotating laser 11 is operated via an operating device 35, which is integrated in basic housing 32 and is operable from the outside. Besides operating device 35 integrated in basic housing 32, a remote control 36 may be provided, which can be connected to rotating laser 11 via a communications link. Inside basic housing 21, the measuring device of rotating laser 11 generates a laser beam, which strikes a deflection lens 37 rotating about axis of rotation 18. The laser beam is deflected 90° by deflection lens 37 and forms rotating laser beam 22 of rotating laser 11, which subtends a laser plane. In the horizontal position of rotating laser 11, rotating laser beam 22 produces a horizontal laser plane 38.

Laser receiver 12 comprises a receiver housing 41, an operating device 42, an optical display 43, a loudspeaker 44 and detection field 25. Detection field 25 has in longitudinal direction 28 a detection height $H_D$ and in transverse direction 29 a detection width Bp. Operating device 42, optical display 43, loudspeaker 44 and detection field 24 are integrated in receiver housing 41 of laser receiver 12. The user can read information about laser receiver 12 via optical display 43. The information includes for example a charging state of laser receiver 12, information about communications link 13 to a rotating laser 11, and the adjusted volume of loudspeaker 44. In addition, the distance of received beam 24 to zero position 26 of laser receiver 12 can be visually indicated as a numerical value. Alternatively or additionally to the visual indication on optical display 43, the distance of received beam 24 can be conveyed via loudspeaker 44. Zero position 26 of detection field 25 is indicated on receiver housing 42 by means of marking notches 45.

Figure 3:
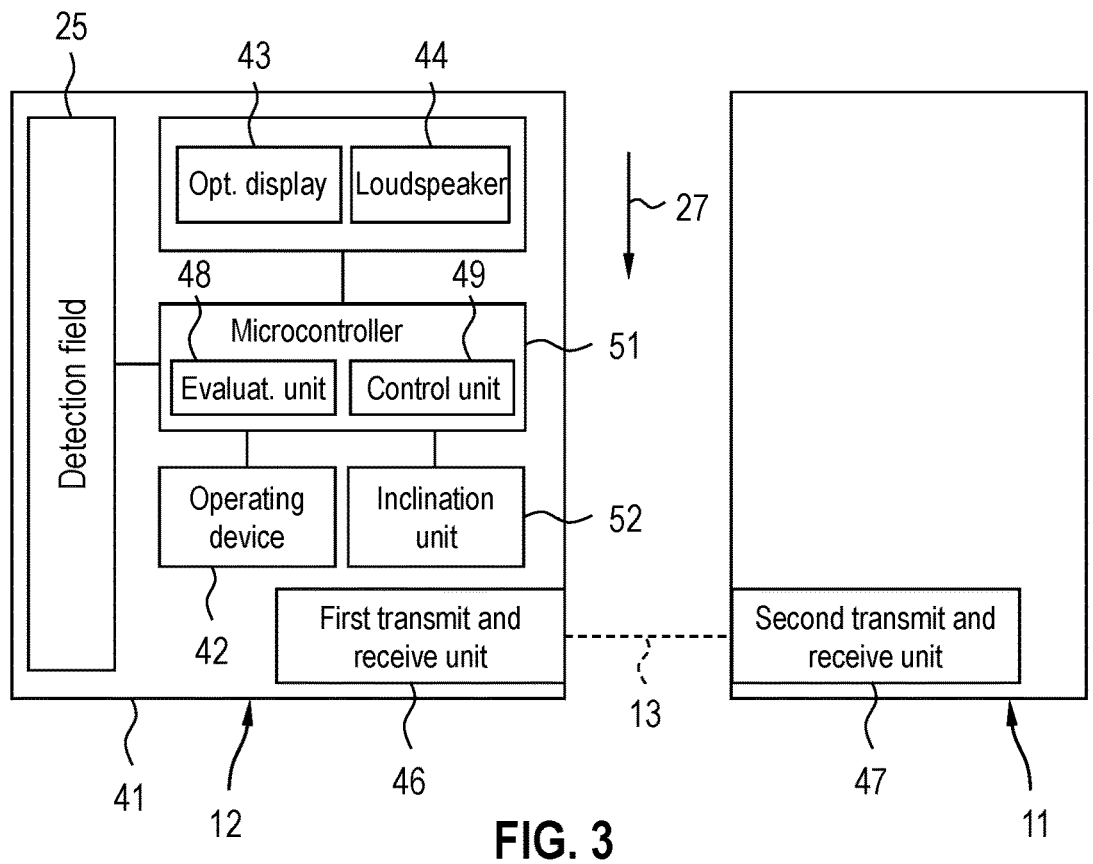
FIG. 3 illustrates the structure of the laser receiver and the interaction with the rotating laser in the form of a block diagram.

FIG. 3 depicts the structure of laser receiver 12 in detail and the interaction of laser receiver 12 with rotating laser 11 in the form of a block diagram. Communication between laser receiver 12 and rotating laser 11 may take place via communications link 13, which connects a first transmit and receive unit 46 in laser receiver 12 to a second transmit and receive unit 47 in rotating laser 11. The first and second transmit and receive units 46, 47 are designed as wireless modules for example and communication between laser receiver 12 and rotating laser 11 occurs via a communications link 13 designed as a wireless connection.

Detection field 25, optical display 43 and loudspeaker 44 are connected to an evaluation unit 48, which is arranged inside receiver housing 41. Evaluation unit 48 is connected to a control unit 49 for controlling laser receiver 12, wherein evaluation unit 48 and control unit 49 are integrated in a monitoring unit 51 designed as a microcontroller for example. Laser receiver 12 can also comprise an inclination sensor 52, which is arranged inside receiver housing 41 and is connected to monitoring unit 51. Using inclination sensor 52, one can measure an inclination of laser receiver 12 relative to gravitational direction 27 of the gravitational field. Inclination sensor 52 may comprise for example a 2-axis acceleration sensor or two 1-axis acceleration sensors.

Figure 4:
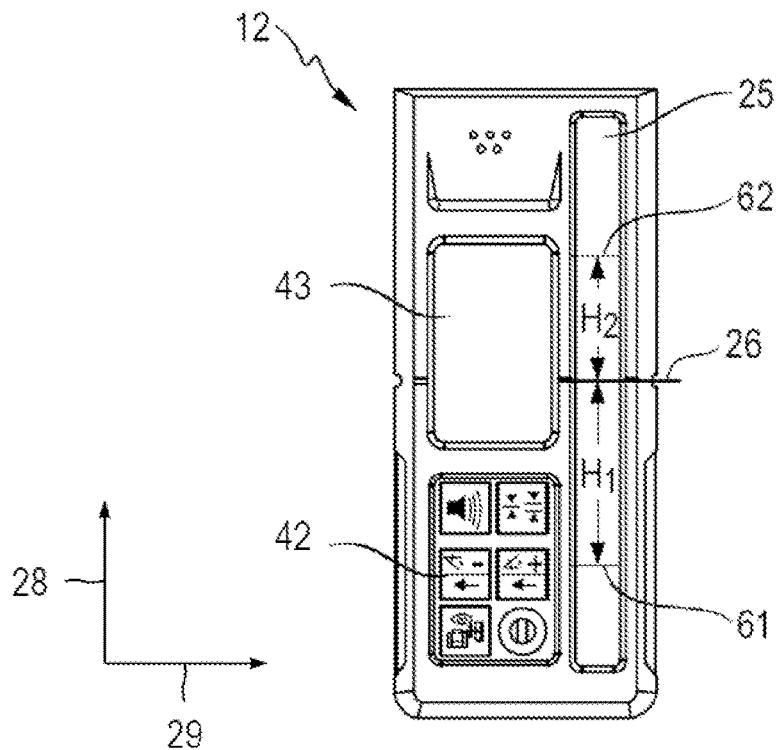
FIG. 4 illustrates the device from FIG. 1 in executing a method according to the invention for comparing a received beam incident on the laser receiver with a rotating laser beam of the rotating laser.

FIG. 4 depicts device 10 executing the method according to the invention for comparing received beam 24 with rotating laser beam 22. Rotating laser 11 is arranged in a horizontal position on tripod 14 and laser receiver 12 is oriented in a longitudinal arrangement. For the orientation of components 11, 12, 14 of device 10 in relation to gravitational direction 27, the following applies: axis of rotation 21 of rotating laser 11, height direction 16 of tripod 14 and longitudinal direction 28 of detection field 25 are oriented parallel to the gravitational direction 27, and transverse direction 29 of detection field 25 is oriented perpendicular to gravitational direction 27. Rotating laser beam 22 produces horizontal laser plane 38, which is arranged perpendicular to gravitational direction 27.

Rotating laser 11 is adjusted by tripod 14 in a known height direction (height direction 16 or opposite to height direction 16) along axis 15 until detection field 25 of laser receiver 12 detects a received beam. The height adjustment of rotating laser 11 is then continued along axis 15. During the height adjustment of rotating laser 11, the incident positions of received beam 24 on detection field 25 are determined by evaluation unit 48 at various points in time.

At a first point in time $t_1$, evaluation unit 48 determines the incident position of received beam 24 on detection field 25 as a first incident position 61 and stores the distance of first incident position 61 to zero position 26 of detection field 25 as first height position H1. At a later point in time $t_2$, evaluation unit 48 determines the incident position of received beam 24 on detection field 25 as a second incident position 62 and stores the distance of second incident position 62 to zero position 26 of detection field 25 as second height position H2. Evaluation unit 48 determines from the first and second height positions H1, H2 an adjustment direction 63 of received beam 24 relative to laser receiver 12.

Figure 5:
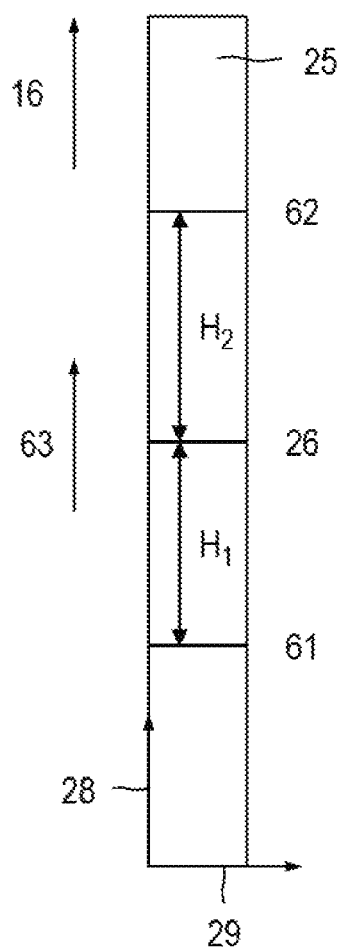
FIG. 5 illustrates a first and second incident position, which the rotating laser beam of the rotating laser produces on a detection field of the laser receiver.

FIG. 5 depicts the first and second incident positions 61, 62, which rotating laser beam 22 of rotating laser 21 produces on detection field 25 of laser receiver 12. Laser receiver 12 is oriented in a longitudinal arrangement and longitudinal direction 28 of detection field 25 runs parallel to gravitational direction 27. First incident position 61 has a first distance H1 to zero position 26 of detection field 25 and second incident position 62 has a second distance H2 to zero position 26 of detection field 25. Adjustment direction 63 of received beam 24 runs parallel to longitudinal direction 28 of detection field 25.

Evaluation unit 48 of laser receiver 12 determines from first and second elevation positions H1, H2 adjustment direction 63 of received beam 24 relative to laser receiver 12 and compares adjustment direction 63 of received beam 24 with height direction 16 of tripod 14. Adjustment direction 63 of received beam 24 and height direction 16 of tripod 14 are aligned in the same direction and received beam 24 is categorized by evaluation unit 48 of laser receiver 12 as a rotating laser beam 22.

Figure 6:
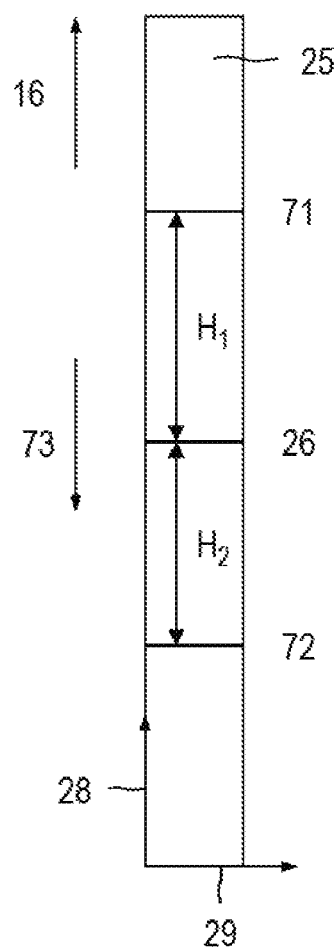
FIG. 6 illustrates a first and second incident position, which the rotating laser beam of the rotating laser produces, after a reflection on a reflecting surface, on the detection field of the laser receiver.

FIG. 6 depicts a first and second incident position 71, 72, which rotating laser beam 22 produces, after a simple reflection on a reflecting surface, on detection field 25 of laser receiver 12. First incident position 71 has a first distance to zero position 26 of detection field 25, and second incident position 72 has a second distance to zero position 26 of detection field 25, wherein the first distance is referred to as first height position H1 and the second distance is referred to as second height position H2.

From the first and second height positions H1, H2, evaluation unit 48 of laser receiver 12 determines an adjustment direction 73 of received beam 24 relative to laser receiver 12 and compares adjustment direction 73 of received beam 24 with position height direction 16A of tripod 14. Adjustment direction 73 of received beam 24 and positive height direction 16A of tripod 14 are opposite to each other and received beam 24 is categorized by evaluation unit 48 of laser receiver 12 as a reflected laser beam.

By means of a single reflection of rotating laser beam 22 on a reflecting surface, the adjustment direction of the received beam on detection field 25 is reversed. This reversal of the adjustment direction is used to distinguish between a rotating laser beam, which was reflected on a reflecting surface, from a rotating laser beam.

Figure 7:
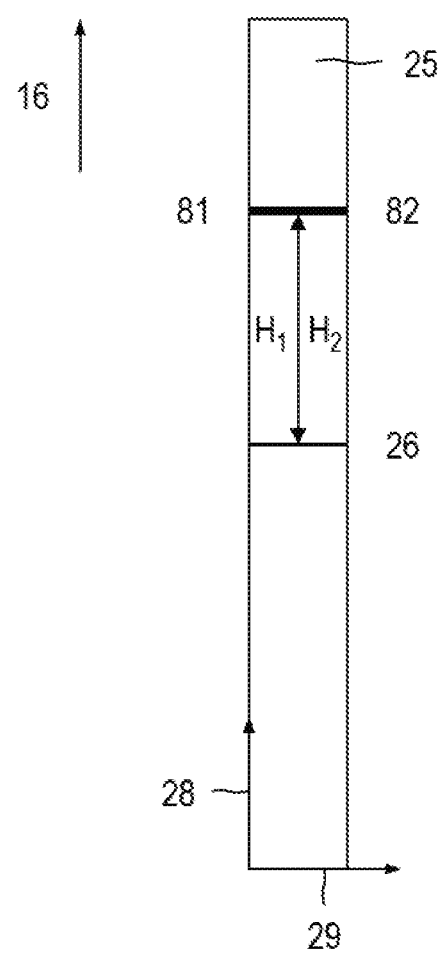
FIG. 7 illustrates a first and second incident position, which a received beam designed as a non-rotating extraneous beam produces on the detection field of the laser receiver.

FIG. 7 depicts a first and second incident position 81, 82, which produces a received beam 24, designed as a non-rotating extraneous beam, on detection field 25 of laser receiver 12. First incident position 81 has a first distance to zero position 26 of detection field 25, and second incident position 82 has a second distance to zero position 26 of detection field 25, wherein the first distance is referred as first height position H1 and the second distance is referred to as second height position H2.

Evaluation unit 48 of laser receiver 12 determines the difference between the first and second height positions H1, H2. First incident position 81 essentially matches second incident position 82 and the difference between the first and second height positions H1, H2 is zero. When the difference is zero, evaluation unit 48 of laser receiver 12 cannot determine an adjustment direction of received beam 24 relative to laser receiver 12. Since received beam 24 is designed as a non-rotating extraneous beam, the adjustment of rotating laser 11 along axis 15 has no influence on the incident position of received beam 24 on detection field 25.

When executing the method according to the invention, rotational laser 11 is oriented in a horizontal position and laser receiver 12 is oriented in a longitudinal arrangement. Horizontal laser plane 38, which is produced by rotating laser beam 22, is adjusted along axis 15 by means of tripod 14. Evaluation unit 48 of laser receiver 12 produces an adjustment direction and compares the adjustment direction with height direction 16 of tripod 14. One shall thereby note that the adjustment direction depends on the position of laser receiver 12 and the adjustment directions in opposite positions of laser receiver 12 are opposite to each other. The position of laser receiver 12 to rotating laser 11 can be determined by means of rotating laser beam 22.

The rotating laser beam produces a vertical laser plane limited to an angle $\varphi$ less than 360°; angles less than 180° are particularly suited as angle $\varphi$. Rotating laser 11 begins its rotation about axis of rotation 21 in an angle of rotation, which is referred to as a zero-angle. Based on the zero-angle, a positive angle range between 0° and +180° and a negative angle range between 0° and −180° can be specified.

Alternatively, the rotating laser beam is moved in a direction of rotation across 360° about axis of rotation 21 and the angle of 360° is subdivided into a first and second angle range; for example, the positive angle range between 0° and 180° can be specified as a first angle range and the negative angle range between 0° and −180° can be specified as the second angle range. To differentiate between the first and second angle ranges, the rotating laser beam has in the first and second angle ranges at least one different beam property. Based on the beam property by which rotating laser beam 22 differentiates itself in the first and second angle ranges, evaluation unit 48 of laser receiver 12 can determine the angle range in which detection field 25 of laser receiver 12 was struck by received beam 24.

A modulation signal for example is suited to be a beam property, which can be used to differentiate between the first and second angle ranges. A first modulation signal is used in the first angle range, and a second modulation signal, which differs from the first modulation signal, is used in the second angle range. The first and second modulation signals can differ from each other in amplitude, shape and/or modulation frequency. Within the scope of the method according to the invention, evaluation unit 48 of laser receiver 12 analyzes incident received beam 24 and can determine the modulation signal with which received beam 24 was modulated. Based on the modulation signal, evaluation unit 48 can determine the angle range in which detection field 25 of laser receiver 12 was struck by received beam 24.

The invention claimed is:

1. A method for comparing a received beam incident on a laser receiver with a rotating laser beam moved by a rotating laser about an axis of rotation of the rotating laser, wherein the laser receiver includes an evaluation unit of a microcontroller and a detection field having a longitudinal direction and a transverse direction, comprising the steps of:
   disposing the rotating laser on a tripod that is adjustable along an axis of the tripod, wherein the axis of rotation of the rotating laser and the axis of the tripod are oriented parallel to a gravitational direction of a gravitational field;
   orienting the laser receiver in a longitudinal arrangement, wherein in the longitudinal arrangement, the longitudinal direction of the detection field is oriented parallel to the gravitational direction and the transverse direction of the detection field is oriented perpendicular to the gravitational direction;
   adjusting the rotating laser on the tripod in a height direction along the axis of the tripod at least until the received beam is incident on the detection field of the laser receiver;
   determining, in the longitudinal direction of the detection field, an adjustment direction of the received beam relative to the laser receiver by the evaluation unit; and
   comparing the adjustment direction of the received beam by the evaluation unit with the height direction of the tripod.

2. The method according to claim 1 further comprising the steps of storing a first incident position of the received beam on the detection field at a first point in time by the evaluation unit as a first height position and storing a second incident position at a second point in time as a second height position, wherein the second point in time is later than the first point in time, and wherein the adjustment direction of the received beam is determined by the evaluation unit from the first and the second height positions.

3. The method according to claim 2 further comprising the step of categorizing the received beam by the evaluation unit as an extraneous beam when the first and the second height positions of the received beam essentially match.

4. The method according to claim 2, wherein the adjustment direction of the received beam is determined by the evaluation unit when the first and the second height positions of the received beam are different.

5. The method according to claim 4 further comprising the step of categorizing the received beam by the evaluation unit as a rotating laser beam when the adjustment direction of the received beam and the height direction of the tripod are oriented in a same direction.

6. The method according to claim 5 further comprising the step of switching the laser receiver into a measurement mode by the evaluation unit, wherein a position of the received beam is determined in the measurement mode.

7. The method according to claim 4 further comprising the step of categorizing the received beam by the evaluation unit as a reflected laser beam when the adjustment direction of the received beam and the height direction of the tripod are oriented in opposite directions.

8. The method according to claim 1, wherein the rotating laser beam produces a horizontal laser plane limited to an angle (q) less than 360°.

9. The method according to claim 8 further comprising the step of moving the rotating laser beam in a direction of rotation across 360° about the axis of rotation, wherein the rotating laser beam is switched on within the angle (φ) and switched off outside the angle (φ).

10. The method according to claim 8 further comprising the step of moving the rotating laser beam back and forth within the angle (φ) in alternating directions of rotation about the axis of rotation.

11. The method according to claim 1 further comprising the step of moving the rotating laser beam in a direction of rotation across an angle of 360° about the axis of rotation and subdividing the angle of 360° into a first and a second angle range, wherein the rotating laser beam in the first and the second angle range is differentiated by one beam property or multiple beam properties.

12. The method according to claim 11 further comprising the step of modulating the rotating laser beam using a modulation signal, wherein in the first angle range, a first modulation signal is used, and in the second angle range, a second modulation signal that is different from the first modulation signal is used.

13. A device, comprising:
a rotating laser which emits a laser beam rotating about an axis of rotation in a direction of rotation and which is disposed on a tripod that is adjustable along an axis; and
a laser receiver which has an evaluation unit of a microcontroller and a detection field for executing the method according to claim 1.

14. The device according to claim 13, wherein the laser receiver has an inclination sensor which measures an inclination of the laser receiver relative to the gravitational direction.

15. The device according to claim 13, wherein the tripod and the laser receiver are connectable in a communicating manner via a communications link, wherein a communication occurs between the evaluation unit of the laser receiver and a monitoring unit of the tripod.

* * * * *